United States Patent
Golbs et al.

(10) Patent No.: US 9,389,024 B2
(45) Date of Patent: Jul. 12, 2016

(54) HEAT STORAGE SYSTEM

(75) Inventors: Andreas Golbs, Selb (DE); Stefan Weber, Ilsede (DE)

(73) Assignee: RAWEMA COUNTERTRADE HANDELSGESELLSCHAFT MBH (DE)

( * ) Notice: Subject to any disclaimer, the term of this patent is extended or adjusted under 35 U.S.C. 154(b) by 260 days.

(21) Appl. No.: 13/060,364

(22) PCT Filed: Mar. 9, 2010

(86) PCT No.: PCT/EP2010/001459
§ 371 (c)(1),
(2), (4) Date: Jun. 8, 2015

(87) PCT Pub. No.: WO2010/102787
PCT Pub. Date: Sep. 16, 2010

(65) Prior Publication Data
US 2011/0146940 A1    Jun. 23, 2011

(30) Foreign Application Priority Data
Mar. 9, 2009 (DE) .......................... 10 2009 012 318

(51) Int. Cl.
*F28D 19/00* (2006.01)
*F28D 20/02* (2006.01)
(Continued)

(52) U.S. Cl.
CPC .......... *F28D 20/021* (2013.01); *F24D 17/0015* (2013.01); *F24D 17/0026* (2013.01);
(Continued)

(58) Field of Classification Search
CPC ............ F28D 2020/0082; F28D 20/02; F28D 20/021; F28D 20/028

USPC .......................... 126/587, 596, 617, 619, 910; 165/104.21
See application file for complete search history.

(56) References Cited

U.S. PATENT DOCUMENTS 3,569,669 A * 3/1971 March ........................... 392/341
3,668,880 A * 6/1972 Gille ............................... 62/45.1
(Continued)

FOREIGN PATENT DOCUMENTS

AT    382 636 B    1/1981
JP    60064192 A   4/1985
(Continued)

OTHER PUBLICATIONS

Document entilted "Niederschrift über die Anhörung" and an uncertified unofficial translation thereof which are minutes of oral proceedings held on Jul. 26, 2011 before the German Patent Office in connection with the German priority application.
(Continued)

*Primary Examiner* — Avinash Savani
*Assistant Examiner* — Deepak Deean
(74) *Attorney, Agent, or Firm* — Carter, DeLuca, Farrell & Schmidt, LLP

(57) ABSTRACT

The present invention relates to a heat storage system with a plurality of storage tanks, in which a latent heat storage medium is disposed, and with a conduit system with supply conduits for supplying heat into the storage tanks and with discharge conduits for removing heat from the storage tanks, wherein the conduit system includes one or more valves by means of which at least one supply conduit to at least one of the storage tanks and/or at least one discharge conduit from at least one of the storage tanks can be shut off or be varied in its flow rate, and with a control unit which is connected with the one or more valves and is configured such that it actuates the same.

13 Claims, 1 Drawing Sheet

(51) Int. Cl.
   *F24D 17/00* (2006.01)
   *F24D 19/10* (2006.01)
   *F28D 20/00* (2006.01)

(52) U.S. Cl.
   CPC ............ *F24D19/1051* (2013.01); *F28D 20/02* (2013.01); *F28D 20/028* (2013.01); *F24D 2220/10* (2013.01); *F28D 2020/0082* (2013.01); *Y02B 10/20* (2013.01); *Y02E 60/145* (2013.01)

(56) References Cited

U.S. PATENT DOCUMENTS

| | | | | |
|---|---|---|---|---|
| 4,012,920 A | * | 3/1977 | Kirschbaum | 62/235.1 |
| 4,091,863 A | * | 5/1978 | Schroder | 165/104.17 |
| 4,153,105 A | * | 5/1979 | Schroder | 165/104.17 |
| 4,199,021 A | | 4/1980 | Thoma | |
| 4,280,553 A | * | 7/1981 | Bean et al. | 165/104.17 |
| 4,291,750 A | * | 9/1981 | Clyne et al. | 165/294 |
| 4,294,227 A | * | 10/1981 | Kreibich et al. | 126/400 |
| 4,328,791 A | * | 5/1982 | Moore et al. | 126/586 |
| 4,347,892 A | * | 9/1982 | Clyne et al. | 165/10 |
| 4,355,627 A | * | 10/1982 | Scarlata | 126/400 |
| 4,403,645 A | * | 9/1983 | MacCracken | 165/10 |
| 4,454,864 A | * | 6/1984 | Duncker et al. | 126/636 |
| 4,491,172 A | * | 1/1985 | Hitchin | 165/10 |
| 4,503,838 A | * | 3/1985 | Arrhenius et al. | 126/263.03 |
| 4,696,338 A | * | 9/1987 | Jensen et al. | 165/104.17 |
| 4,850,424 A | * | 7/1989 | Mitani et al. | 165/10 |
| 6,757,486 B2 | * | 6/2004 | Hirano | 392/344 |
| 2004/0000159 A1 | * | 1/2004 | Xu | 62/260 |
| 2005/0262870 A1 | * | 12/2005 | Narayanamurthy et al. | 62/434 |
| 2008/0301869 A1 | * | 12/2008 | Mock et al. | 4/615 |
| 2010/0229583 A1 | * | 9/2010 | Komori et al. | 62/238.7 |

FOREIGN PATENT DOCUMENTS

| | | |
|---|---|---|
| JP | H07-139890 A | 6/1995 |
| JP | 08-005276 | 1/1996 |
| JP | H08-233313 A | 9/1996 |
| JP | 2001-504208 A | 3/2001 |
| JP | 2001-153579 A | 6/2001 |
| WO | WO 98/40684 A1 | 9/1998 |

OTHER PUBLICATIONS

English translation of a Japanese Office Action issued by the Japanese Patent Office, dated Feb. 12, 2014; 4 pages.

Japanese Pre-Appeal Reconsideration Report (with English Translation), dated Apr. 15, 2015, corresponding to Japanese Patent Application No. 2011-553343 (Appeal No. 2015-002971); 9 total pages.

* cited by examiner

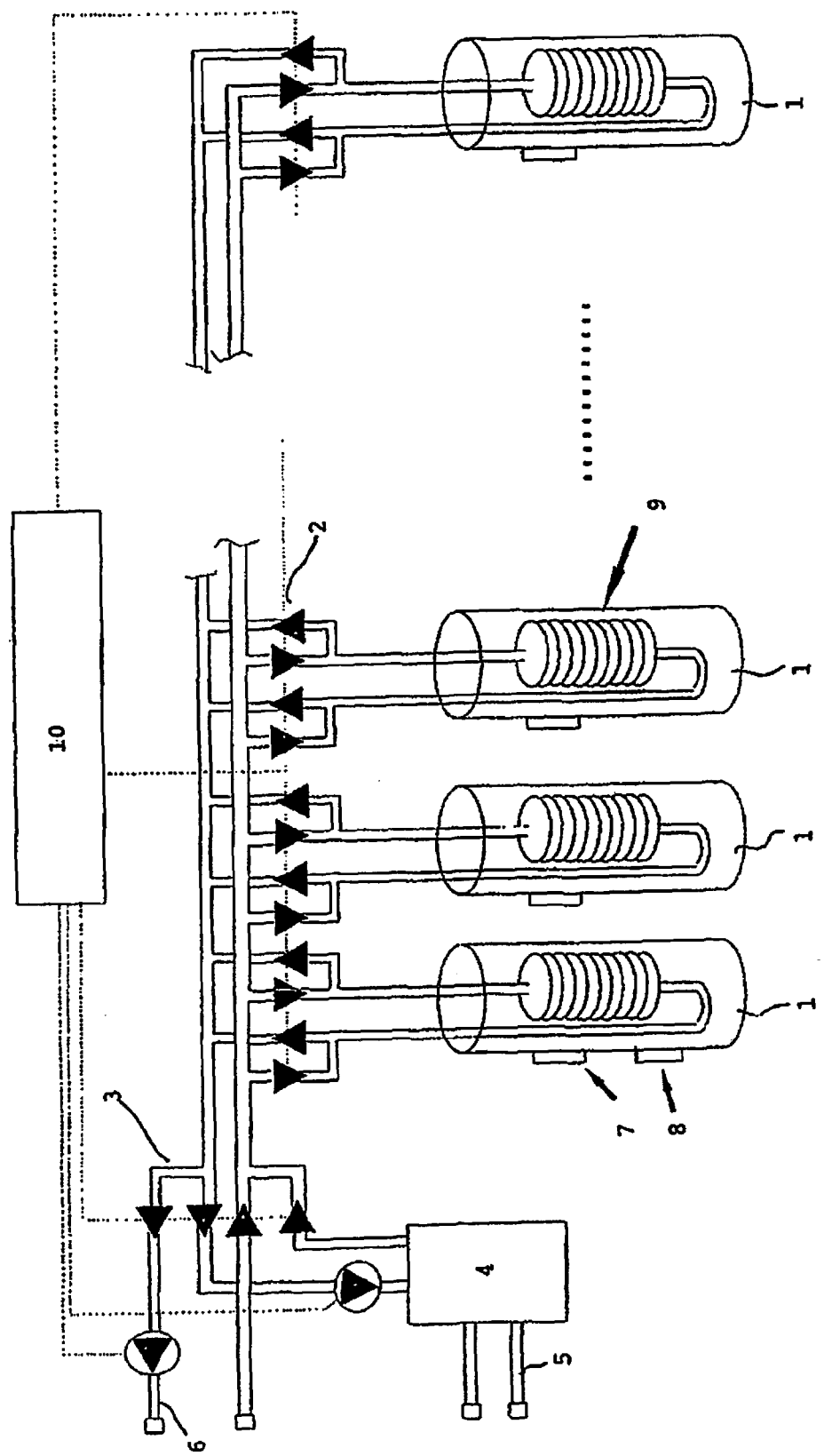

HEAT STORAGE SYSTEM

This application claims priority to German Application No. 10 2009 012 318.0, filed Mar. 9, 2009 and PCT Application No. PCT/EP2010/001459, filed Mar. 9, 2010, the entireties of which are both hereby incorporated by reference.

The present invention relates to a heat storage system.

At present, numerous applications such as the provision of hot water in buildings are known, for which the storage of heat is advantageous and therefore desirable. It is known, for example, to store heat generated by solar radiation during the day, so as to then be able to utilize the same in the case of missing or comparatively little solar radiation.

It is the object underlying the present invention to create a heat storage system operating in an advantageous way. In accordance with the invention it is provided that the heat storage system is configured with a plurality of storage tanks, in which a latent heat storage medium is disposed, and with a conduit system with supply conduits for supplying heat into the storage tanks and with discharge conduits for removing heat from the storage tanks, wherein the conduit system includes one or more valves by means of which at least one supply conduit to at least one of the storage tanks and/or at least one discharge conduit from at least one of the storage tanks can be shut off or be varied in its flow rate, and with a control unit which is connected with the one or more valves and is configured such that it actuates the same in a suitable manner, preferably depending on demand and/or in dependence on the heat available for loading.

In accordance with the invention it thus is provided that the heat storage system includes a plurality of storage tanks which comprise a latent heat storage medium, for example a salt hydrate or preferably another medium crystallizing upon removal of heat. Via the supply conduits, heat can be supplied to the latent heat reservoirs, and via the discharge conduits heat can be removed from the same, if necessary.

The supply and removal of heat is controlled or regulated by a control unit, which acts on valves which control or regulate the supply of heat or a heat transfer medium and the removal of heat or the heat transfer medium, respectively.

The invention furthermore relates to a heat storage system with one or more storage tanks in which a latent heat storage medium is disposed, wherein the heat storage system is configured such that it is operable in a first operating mode in which sensible heat of the latent heat storage medium is utilized, and that it is operable in a second operating mode in which the heat of fusion of the latent heat storage medium is utilized.

"Sensible heat" is understood to be the heat or the heat content of the latent heat storage medium, which can be withdrawn without the occurrence of a phase change. In accordance with the invention it is provided according to this aspect of the invention that the heat storage system is operable in the first operating mode or also in the second operating mode or also in both operating modes. The choice of the operating mode preferably can be specifiable by a control unit which depending on the heat requirement operates the heat storage system in the first or in the second or in both operating modes, for example simultaneously or successively.

The two above-mentioned inventions can also be present in combination, so that in one aspect of the invention the heat storage system according to claim 1 is configured with the features of claim 2.

Preferably, it is provided that several or all of the storage tanks can be actuated individually via valves. Hence it is possible to selectively actuate one or more of the storage tanks, i.e. to "load" the same with heat or to withdraw heat from the same.

The terms "load" and "loading" or "unload" and "unloading" used in accordance with the invention mean the supply of heat into the latent heat storage medium or the removal of heat from the latent heat storage medium.

In a further aspect of the invention it is provided that the choice of the operating mode is effected automatically and/or that the operating modes can be chosen independently.

It is conceivable, for example, that in dependence on the amount of heat required the first operating mode or the second operating mode or simultaneously or sequentially both operating modes are adjustable automatically.

In a further aspect of the invention it is provided that the heat storage system includes one or more heat circuits or is connected with the same, via which heat from the one or more storage tanks can be supplied to one or more heat consumers.

It is conceivable that the heat storage system includes at least one heat circuit or is connected with at least one heat circuit, in which at least one heat exchanger is provided for heating service water. It is conceivable, for example, to use the heat stored in the latent heat storage media for heating service water for example in a household.

In a further aspect of the invention it is provided that the heat storage system includes at least one heat circuit or is connected with the same, which serves as heating circuit. Thus, it is possible to use the heat stored in the latent heat storage media for heating a building, for example.

In a further aspect of the invention it is provided that the control unit is connected with at least one sensor which emits a signal representative for the heat requirement of at least one consumption point and/or for the heat content of at least one storage tank, and that in dependence on the at least one sensor signal the control unit actuates the one or more valves of the conduit system of the storage tanks.

In a further aspect of the invention it is provided that in the first operating mode at least one storage tank is switched in when the amount of sensible heat of the storage tanks already switched in is not sufficient.

Furthermore, it can be provided that switching over from the first into the second operating mode is effected when the sensible heat of the latent heat storage medium is exhausted and/or that the control unit is configured such that on loading the storage tanks it initially supplies heat to the one or more storage tanks with the smallest or a comparatively small heat content, and after loading the same, preferably after completely loading the same, switches over to one or more further storage tanks, so that heat is supplied to the same.

In a further aspect of the invention it is provided that the storage tank has a width or depth or a diameter<50 cm, preferably <30 cm, and particularly preferably in the range from 5 cm to 15 cm. These small dimensions allow to space-savingly integrate the latent heat storage system or at least the one or more storage tanks in walls for the fixed, i.e. stationary operation, or to configure the same in an assembly in front of a wall.

As explained above, the latent heat storage medium preferably is such a storage medium which crystallizes upon removal of heat and changes into the liquid state with the supply of heat.

Furthermore, it can be provided that the heat storage system is connected with a heat source, in particular with a solar system, comprising a burner for burning wood, wood pellets, oil or gas, etc., or comprises such heat source. This heat source is connected with the conduit system and serves to supply the heat generated in this way to the one or more storage tanks, if necessary.

The invention furthermore relates to a building or to a mobile unit, such as a travel trailer, motor vehicle and the like with at least one heat storage system according to any of claims 1 to 14.

Further details and advantages of the invention will be explained in detail with reference to an embodiment illustrated in the drawing.

The only FIGURE shows a heat storage system in accordance with the present invention in a schematic view.

The heat storage system in accordance with the present invention includes a plurality of storage tanks 1 subsequently referred to as clusters 1. These clusters 1 are particularly useful for the stationary long-term storage of heat and for the consumption-related provision of heat. As shown in the FIGURE, the latent heat storage unit consists of a random number of storage tanks or clusters 1.

The individual clusters 1 are filled with a latent heat storage medium.

The heat storage system in accordance with the present invention furthermore comprises a central control unit 10 with the necessary sensors and heat circuits for loading and unloading the latent heat storage media with heat.

As shown in the FIGURE, each of the clusters 1 can be actuated individually via valves combined in a valve block 2, i.e. heat can be supplied selectively to each cluster 1 and heat can be discharged selectively from each cluster 1, respectively. This is effected by correspondingly switching the valves present in the valve block 2, which valves in turn are actuated by the control unit 10.

As can furthermore be taken from the FIGURE, the heat of the latent heat storage medium present in the clusters 1 can be utilized to operate a heating circuit, which in the FIGURE is designated with the reference numeral 6. This heating circuit is actuated by switching corresponding valves in the valve block 3.

In addition, a further heat circuit is provided, which comprises the plate heat exchanger 4 which serves to provide hot water as service water. The hot water connection for example of a house is designated with the reference numeral 5.

This additional heat circuit, too, can be actuated by corresponding valves of the valve block 3. The actuation of the valves in the valve block 3 like those of the pumps of both heat circuits is effected by the control unit 10.

As can furthermore be taken from the FIGURE, each cluster 1 consists of a tubular formation which is filled with the latent heat storage medium, preferably salt hydrate. A conduit which is filled with or traversed by water or some other heat transfer medium extends through the same, so that the water or some other heat transfer medium, such as the latent heat storage medium itself, either releases heat to the latent heat storage medium present in the cluster 1 or absorbs heat from the same, depending on the mode of operation.

After being charged completely, the latent heat storage units or clusters 1 preferably release the stored heat in two separate modes. The disadvantages of an "either-or mode" thus are avoided, although such mode of operation is also comprised by the invention.

The utilization of the sensible, i.e. perceptible heat and of the heat of fusion independent of each other provides for the short-term as well as long-term provision of heat.

While the sensible heat preferably is stored for a short period and according to the embodiment represented here chiefly is available for heating service water, the heat of fusion or latent heat can be provided on a long-term basis and for example serve for operating a heating system.

The operating behavior with respect to the short-term storage of heat corresponds to the usual storage technology available on the market. In the embodiment shown here, however, a plate heat exchanger is used instead of a hot water reservoir. The risk of the contamination or legionella infestation thereby is prevented from the start. Apart from this, energy losses due to precautionary measures of a temperature increase for killing bacteria are excluded.

Loading the clusters 1 or the latent heat storage media disposed thereon can be performed via all available heat sources. By way of example, solar-thermal plants, wood pellets, chimneys, oils or gas burners etc. should be mentioned.

The loading and unloading process, i.e. the supply of heat into the clusters 1 and the removal of heat from the clusters 1 is controlled or regulated via the integrated central controller 10.

It can be provided that in an intelligent and forward-looking manner individual clusters 1 are selected and loaded or unloaded.

The sensible heat likewise can be selected and provided as needed via the controller 10.

The long-term storage of the heat preferably is effected in the form of the supercooled melt of the salt hydrate or of some other suitable latent heat storage medium. This storage has a long-term and temperature stability. It is conceivable to perform the retrieval of heat in 1 kWh clusters 1. It is conceivable to perform both the retrieval of heat and the supply of heat by the central controller 10. It can be provided to perform the retrieval of heat with respect to the stored heat of fusion in that a trigger mechanism 8 at the cluster 1 initiates the recrystallization process of the salt hydrate. The salt hydrate in the cluster 1 thereby is heated to 58° C. and the heat can be provided via the heat circuit. Of course, this value only is an exemplary value which does not limit the invention. The trigger mechanism 8 preferably is activated automatically and particularly preferably by the controller 10.

As is indicated in the FIGURE, the clusters 1 have a tubular design. In the illustrated embodiment, they have a diameter of 10 cm. For stationary use, they can thus space-savingly be integrated in walls or be mounted in front of a wall. Thus, the present system is particularly suitable for installation in buildings and can be used there for example for heating service water and/or be used as part or for operation of the heating system.

The loading of the clusters 1 is effected from a non-illustrated heat source via corresponding controllers of the valves of the valve block 2. Preferably, solar-thermally generated heat is supplied. The central control unit 10 selects a completely unloaded cluster 1. The operating condition is detected via a sensor unit 7 at the cluster 1. Via the incorporated valve blocks 2 and 3, the selected cluster 1 now is selected hydraulically and interconnected in the heat circuit such that it can be "loaded" with heat.

The loading operation is continued until the sensor unit 7 present at or in the cluster 1 detects the complete dissolution of the latent heat storage medium. Thereafter, the loading operation is completed.

If further heat from a heat source is available, the selection of a further cluster 1 is effected and loading the same can be effected as described.

After the completion of loading, the latent heat storage medium is heated to a temperature of about 70° C. to 80° C. Due to the heat insulation, the sensible heat can briefly be stored and be utilized for preparing hot water.

If hot water is requested, this is detected by the control unit 10 by means of the sensors at the heat exchanger 4 and a cluster 1 is selected. The same then is interconnected with the plate heat exchanger 4 via the valve blocks 2 and 3 and via the valve position of the valves contained therein. Due to the removal of the sensible heat by means of a heat transfer medium, the latent heat storage medium of the correspondingly selected cluster 1 is cooled and then for example is in the condition of a supercooled melt depending on the amount of heat removed.

Since the crystallization process has not yet been started, the stored heat of fusion still is available therein.

If the amount of heat of a cluster 1 is not sufficient for covering the demand of hot water, further clusters 1 can be switched in. If the reservoir is exhausted based on the amount of sensible heat of all clusters 1, the additional demand can be covered by unloading the heat of fusion, as will be described below.

The supercooled melt can store thermal energy over periods of any length. If this stored heat is required to satisfy the demand, the central control unit 10 selects one or more clusters 1.

Via the illustrated trigger mechanism 8, the crystallization process of the latent heat storage medium is initiated. The cluster 1 is hydraulically interconnected via the valve blocks 2 and 3 and connected to the source of demand. The source of demand can be either the plate heat exchanger 4, i.e. heat which is required for providing service water, or a heating circuit 6. Other heat consumers can also be considered.

Thus, it is conceivable that one cluster 1 after the other is selected, in order to withdraw heat from the same. It is likewise conceivable that the loading and/or unloading of the clusters 1 is effected in groups, i.e. more than one cluster 1 is loaded and/or unloaded at the same time.

As can furthermore be taken from the FIGURE, the conduit system for the heat transfer medium, which is present in the cluster 1, can include a heat exchanger 9 which primarily serves for providing hot water. The same or the heat transfer medium present therein or traversing the same primarily utilizes the sensible heat of the latent heat storage medium present in the cluster 1.

In the embodiment described above, the heat of fusion of the salt hydrate was requested after the sensible heat of the latent heat storage medium was exhausted. In principle, it is of course also conceivable to perform these processes not sequentially, but simultaneously. For example, it is conceivable to employ one or several clusters for preparing service water or for a heat sink for which the sensible heat is sufficient, and to employ one or more other clusters for the heating operation or for a heat sink for which the heat released by phase change is required.

It is particularly advantageous when the unloading processes as well as the loading process of the one or more clusters is effected fully automatically by the controller 10.

The invention claimed is:

1. A method of operating a heat storage system which is installed in a building for long term storage of heat, the system comprising a control unit, a plurality of storage tanks in which a latent heat storage medium is disposed, and a trigger mechanism for initiating a crystallization process of the latent heat storage medium operably connected to the control unit, the method comprising:
    operating the heat storage system during discharging of the system in a first operating mode in which sensible heat of the latent heat storage medium is utilized, and in a second operating mode in which heat of fusion of the latent heat storage medium is utilized and retrieval of the stored heat of fusion is initiated by the trigger mechanism, wherein the choice of each operating mode is effected automatically depending on heat requirements, wherein the long term storage of heat of fusion is effected in the form of a supercooled liquid state of the latent heat storage medium over periods of any length,
    wherein a first storage tank is operating in the first mode and a second storage tank is operating in the second mode, and
    wherein heat obtained during discharging of the system in both the first and second operating modes is transferred to one or more heat consumers.

2. The method of operating a heat storage system according to claim 1, wherein switching over from the first operating mode into the second operating mode is effected when the sensible heat of the latent heat storage medium is exhausted and/or that the control unit is configured such that when supplying heat into the plurality of storage tanks, the control unit initially supplies heat to one or more storage tanks with the smallest or a relatively small heat content, and after loading the one or more storage tanks, the control unit switches over to at least one further storage tank, so that heat is supplied to the at least one further storage tank.

3. The method of operating a heat storage system according to claim 1, wherein several or all of the storage tanks can be actuated individually via valves.

4. The method of operating a heat storage system according to claim 1, wherein the heat storage system includes one or more heat circuits or is connected with the one or more heat circuits, via which heat from the one or more storage tanks is supplied to the one or more heat consumers.

5. The method of operating a heat storage system according to claim 1, wherein the heat storage system includes at least one heat circuit or is connected with at least one heat circuit, in which at least one heat exchanger is provided for heating service water.

6. The method of operating a heat storage system according to claim 1, wherein the heat storage system includes at least one heat circuit or is connected with at least one heat circuit which serves as heating circuit.

7. The method of operating a heat storage system according to claim 1, wherein the control unit is connected with at least one sensor which emits a signal representative for the heat requirement of at least one consumption point, and that in dependence on the at least one sensor signal the control unit actuates the one or more valves of the conduit system of the storage tanks.

8. The method of operating a heat storage system according to claim 1, such that when in the first and/or second operating mode, at least one storage tank is switched in when the amount of sensible heat or of latent heat of the storage tanks already switched in is not sufficient.

9. The method of operating a heat storage system according to claim 1, wherein the storage tank has a width or depth or a diameter<50 cm.

10. The method of operating a heat storage system according to claim 9 wherein the width, depth or diameter is ranges from 5 cm to 15 cm.

11. The method of operating a heat storage system according to claim 1, wherein the latent heat storage medium crystallizes upon removal of heat.

12. The method of operating a heat storage system according to claim 1, wherein the heat storage system includes a heat source.

13. The method of operating a heat storage system according to claim 12, wherein the heat source is a solar system comprising a burner for burning wood, wood pellets, oil or gas.

* * * * *